United States Patent
Frost et al.

(10) Patent No.: US 8,843,920 B2
(45) Date of Patent: Sep. 23, 2014

(54) SYSTEMS AND METHODS FOR DEFERRING SOFTWARE IMPLEMENTATION DECISIONS UNTIL LOAD TIME

(75) Inventors: Gary Frost, Driftwood, TX (US); Shrinivas Joshi, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 869 days.

(21) Appl. No.: 12/560,275

(22) Filed: Sep. 15, 2009

(65) Prior Publication Data

US 2011/0067013 A1  Mar. 17, 2011

(51) Int. Cl.
*G06F 9/445* (2006.01)
*G06F 9/44* (2006.01)
*G06F 9/455* (2006.01)

(52) U.S. Cl.
CPC .............. *G06F 9/44521* (2013.01); *G06F 8/30* (2013.01); *G06F 9/45504* (2013.01)
USPC ........... 717/178; 717/111; 717/173; 717/176; 717/140; 715/223; 715/273

(58) Field of Classification Search
None
See application file for complete search history.

(56) References Cited

U.S. PATENT DOCUMENTS

| | | | |
|---|---|---|---|
| 6,615,166 B1 * | 9/2003 | Guheen et al. ................. | 703/27 |
| 6,625,804 B1 * | 9/2003 | Ringseth et al. .............. | 717/114 |
| 6,957,417 B2 * | 10/2005 | Turner et al. .................. | 717/108 |
| 7,150,010 B1 * | 12/2006 | Ringseth et al. .............. | 717/140 |
| 7,254,806 B1 * | 8/2007 | Yates et al. ..................... | 717/136 |
| 8,261,182 B1 * | 9/2012 | Petersen ........................ | 715/230 |
| 2003/0023957 A1 * | 1/2003 | Bau et al. ....................... | 717/140 |
| 2003/0154468 A1 * | 8/2003 | Gordon et al. ................ | 717/143 |
| 2003/0200350 A1 * | 10/2003 | Kumar et al. ................. | 709/315 |
| 2004/0006765 A1 * | 1/2004 | Goldman ...................... | 717/116 |
| 2004/0015832 A1 * | 1/2004 | Stapp et al. ................... | 717/106 |
| 2005/0005261 A1 * | 1/2005 | Severin ......................... | 717/108 |
| 2005/0021689 A1 * | 1/2005 | Marvin et al. ................ | 709/220 |
| 2005/0216885 A1 * | 9/2005 | Ireland .......................... | 717/108 |
| 2005/0235272 A1 * | 10/2005 | Skinner ......................... | 717/136 |
| 2006/0225053 A1 * | 10/2006 | Lakshman et al. ............ | 717/140 |
| 2008/0127070 A1 * | 5/2008 | Barcia et al. .................. | 717/116 |
| 2008/0134207 A1 * | 6/2008 | Chamieh et al. .............. | 719/315 |
| 2009/0249021 A1 * | 10/2009 | Morris .......................... | 711/202 |
| 2009/0254883 A1 * | 10/2009 | Munson et al. ............... | 717/124 |
| 2010/0088669 A1 * | 4/2010 | Cwalina et al. ............... | 717/106 |
| 2010/0115502 A1 * | 5/2010 | Jiva et al. ...................... | 717/148 |
| 2010/0138820 A1 * | 6/2010 | Joshi ............................. | 717/158 |
| 2010/0145978 A1 * | 6/2010 | Anashkin et al. ............. | 707/769 |
| 2010/0149194 A1 * | 6/2010 | Yu .................................. | 345/505 |
| 2010/0262952 A1 * | 10/2010 | Colton et al. ................. | 717/118 |
| 2010/0293533 A1 * | 11/2010 | Andrade et al. .............. | 717/140 |

* cited by examiner

*Primary Examiner* — Chameli Das

(57) ABSTRACT

A software development method defers certain implementation details until load time. A programmer first annotates, in source code, a selected set of software components using metadata (such as Java-style annotations) that define one or more criteria—e.g., criteria relating to the state of the target hardware platform, the capabilities of the platform, or arbitrary user input. The annotated source code files are then compiled to create one or more intermediate code files (e.g., Java bytecode files). During load time of the resulting intermediate code files, one or more of the selected set of software components are loaded from the intermediate code files based on the criteria.

21 Claims, 5 Drawing Sheets

SYSTEMS AND METHODS FOR DEFERRING SOFTWARE IMPLEMENTATION DECISIONS UNTIL LOAD TIME

TECHNICAL FIELD

Embodiments of subject matter described herein generally relate to software optimization techniques, and more particularly relate to systems and methods for deferring certain software implementation decisions until program load time.

BACKGROUND

Programming languages are often roughly categorized as "compiled languages" (i.e., languages that are converted from source code directly to native machine code, such as C, C++, Fortran, and Pascal), and "interpreted" languages (i.e., languages whose source code is interpreted line-by-line, such as Perl, Ruby, and Smalltalk). In reality, however, this taxonomy is an oversimplification since many traditionally interpreted languages may be compiled, and many traditionally compiled languages may also be run by special interpreters.

Furthermore, many modern languages (JAVA, Python, Lua, C#, and the like) are first compiled to an intermediate representation (e.g., "bytecode" in JAVA), which is then interpreted by a virtual machine (e.g., The JAVA Virtual Machine (JVM)) tailored to a specific operating systems and/or hardware. This is advantageous in that, generally, the use of such virtual machines facilitates the "write once, run anywhere" (WORA) model of software development. Namely, the bytecode and source code are portable, and may be used on a variety of hardware and software platforms, including various personal computers, smart-phones, personal data assistants, netbooks, and the like (generically referred to as "computers" or "computing devices." While traditional compiled languages are generally considered to be faster than interpreted languages, to improve performance, JAVA and other similar environments often perform just-in-time (JIT) compilation (or "dynamic translation") by converting classes and other code at runtime prior to executing it natively on the computer.

Even such cross-platform programming languages are limited, however, in that nearly all implementation choices are fixed at compile time. That is, at load time—when the software code is loaded prior to, or more or less simultaneous with, running the program—the developer cannot normally choose which variables, parameters, methods, and/or classes are to be included in the program.

Furthermore, while modern virtual machines such as the JVM are proficient in applying classical compiler optimization techniques to software code, and JIT compilers have similarly improved the performance of software to a large extent, it would nevertheless be desirable to fine tune such choices based on user interaction and/or other information about the platform or environment that is known to the system at load time.

BRIEF SUMMARY OF EMBODIMENTS

A method in accordance with one embodiment generally includes annotating, in source code, a selected set of software components using metadata defining one or more criteria, compiling the annotated source code files to create one or more intermediate code files, then loading one or more of the selected set of software components from the intermediate code files based on the criteria during load time.

A computer program product in accordance with one embodiment includes a computer-usable medium having computer readable program code embodied therein, the computer readable program code adapted to be executed to implement a class loading method including the steps of receiving a class request, retrieving a class file associated with the class request, examining the class file for metadata defining criteria associated with one or more software components provided within the class file, evaluating the criteria; and loading a selected set of the software components based on the criteria.

A computing device in accordance with another embodiment of the present invention includes, a processor, a mass storage component, a virtual machine stored on the mass storage component, and intermediate code stored on the mass storage component. The processor is configured to execute the virtual machine such that it generates a class request, and the computer instructions are configured to receive the class request, retrieve a class file associated with the class request, examine the class file for metadata defining criteria associated with one or more software components provided within the class file, evaluate the criteria, and load a selected set of the software components based on the criteria to form an implemented class.

This summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In accordance with various embodiments of the present invention, metadata is inserted within software source code during design time, and this metadata is then used later at load time to specify which software components will be implemented when the program runs, based on one or more criteria. In this way, the same software code may be loaded in an optimized manner on a variety of platforms or computing devices, ranging, for example, from general purpose computers to cellular phones, depending upon the resources available on the target platform and other such factors. In the context of a JAVA development environment, for example, JAVA's "annotation" metadata feature is used in conjunction with custom class loaders to defer the selection of particular JAVA classes, fields, methods, and other components until such time as the bytecode is actually loaded.

As a preliminary matter, the following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

For the sake of brevity, conventional techniques related to general purpose computers, software development, programming languages, virtual machines, object-oriented design, and the JAVA programming language may not be described in detail herein. Moreover, the various tasks and process steps described herein may be incorporated into a more comprehensive procedure or process having additional steps or functionality not described in detail herein. In particular, various steps related to the creation, compilation, interpretation, and execution of software code are well known and so, in the interest of brevity, need not be described in detail herein.

Figure 1:
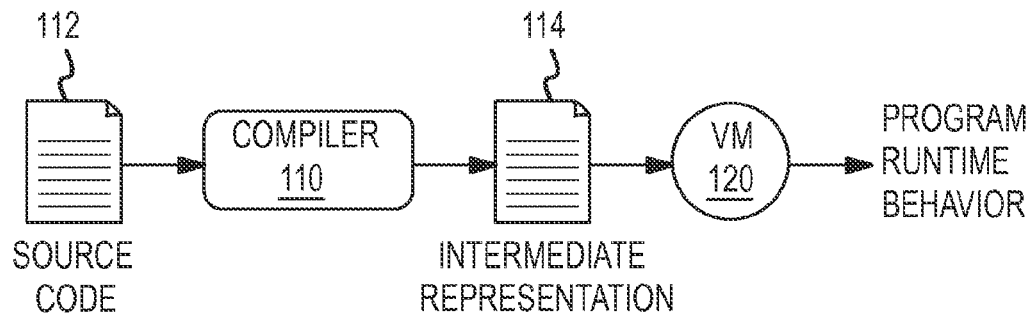
FIG. 1 is a conceptual block diagram illustrating a typical software compilation and execution process.

Referring now to FIG. 1, a typical software development cycle applicable to JAVA and related languages generally includes the compilation of source code (or "source code files") 112 into an intermediate representation (or "intermediate code") 114 via a compiler 110, followed by the execution or running of the intermediate code 114 using a virtual machine (VM) 120, thus producing the program's runtime behavior. In JAVA, for example, source code 112 will typically include a large number of text files (".java" files) which are then compiled to a set of intermediate "bytecode" files 114 (".class" files). The VM 120—that is, a JAVA Virtual Machine (JVM)—then interprets the resulting intermediate code, loading the required classes from files 114 as they are needed.

The term "load time" as used herein means any time interval or collection of time intervals where classes are loaded for implementation. As much of the class loading often occurs during runtime, it will be appreciated that the phrases "runtime" and "load time" are not mutually exclusive: load time will generally overlap with and take place during runtime, since many classes are loaded only when they are needed by the running program.

JAVA and other similar environments often perform just-in-time (JIT) compilation (or "dynamic translation") by converting frequently executed intermediate code (bytecode) to native code at runtime. As mentioned above, traditionally, the bytecode is determined at source code compilation time, and cannot be modified thereafter.

Since each source code file 112 simply consists of lines of text, these files may be produced in a number of ways. For short programming tasks, for example, a conventional text editor (EMACS, Notepad, etc.) may be employed. In most modern software development contexts, however, an integrated development environment (IDE) is used. An IDE is itself a software package that simplifies the creation and organization of code, and is particularly useful in managing large projects requiring re-use of an existing code base. Popular JAVA IDEs include, for example, Eclipse, Netbeans, and JCreator. A typical IDE will include one or more application programming interfaces (APIs), a software development kit (SDK), and a variety of developer tools. One such SDK is the JAVA 2 Platform Standard Edition 5.0 Development Kit (JDK 5.0), whose "annotation" feature will be described in further detail below.

Figure 2:
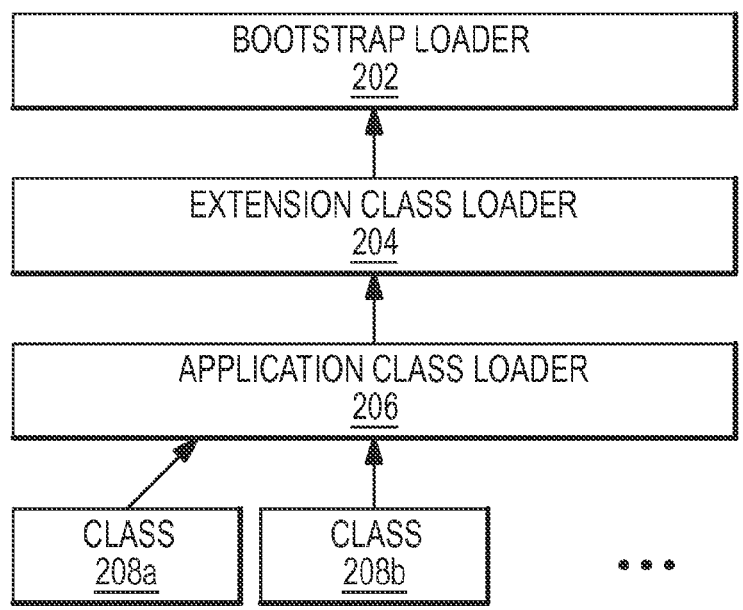
FIG. 2 is a block diagram of a typical JAVA class loader process and hierarchy.

As mentioned above, classes are loaded by the VM 120 as they are needed. More particularly, referring to FIG. 2, during runtime VM 120 requests certain software classes from a hierarchical system of class loaders as illustrated. In this example, requests are handled by a bootstrap loader 202, an extension class loader 204, and an application (custom) class loader 206. Each loader (except the bootstrap loader 202) has a parent, to which it delegates the loading of classes (208a, 208b, etc.) in the event that it does not know the location of the particular class requested.

In accordance with embodiments of the present invention, an application class loader 206 or the like is able to read and parse metadata that has been inserted within the source code 112 for the purpose of annotating certain classes, variables, methods, and other such software components. The metadata defines criteria that are evaluated to determine whether each annotated software component should be loaded during load time.

Figure 3:
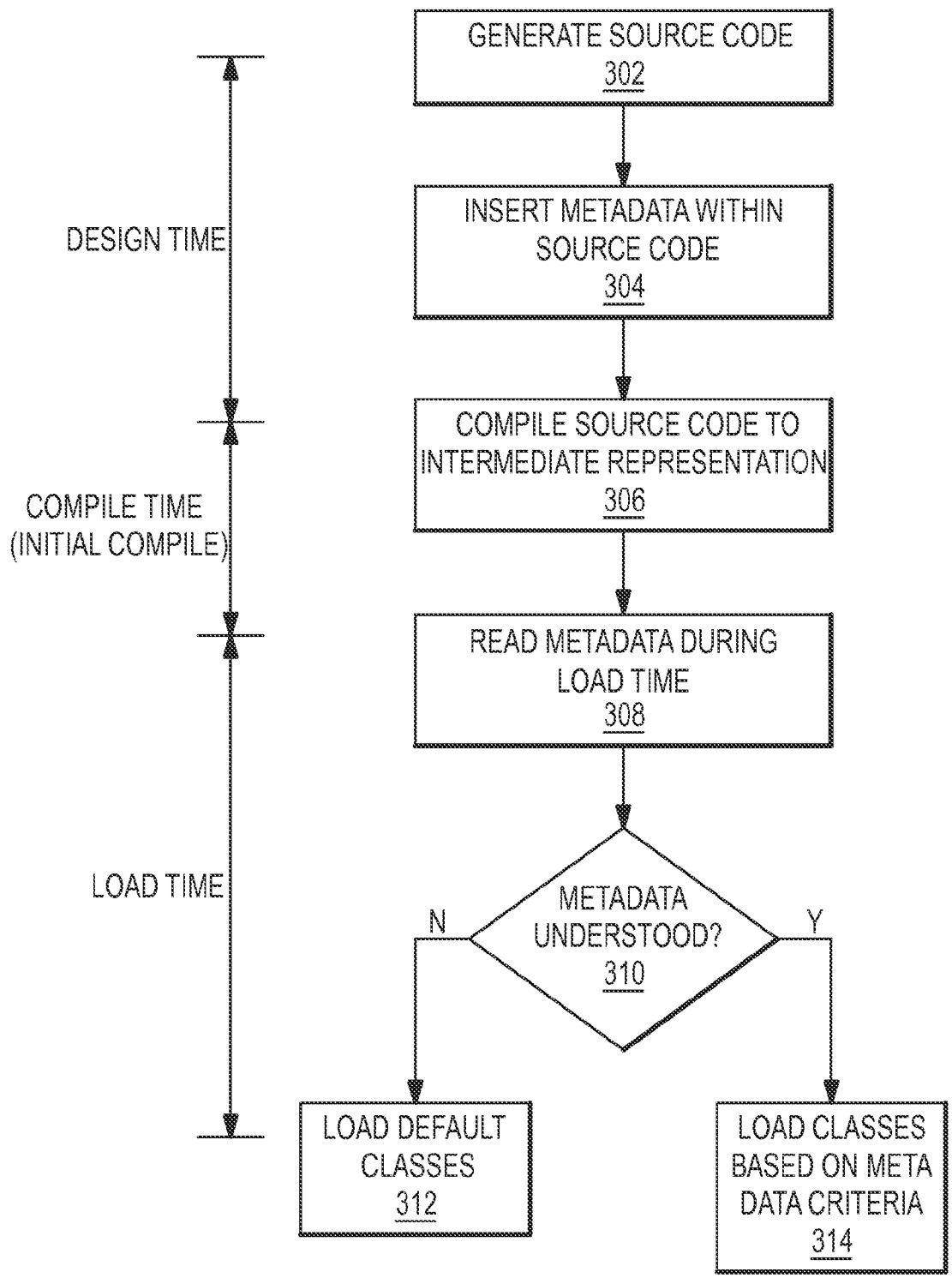
FIG. 3 is a general flowchart of a method in accordance with one embodiment of the present invention.

More particularly, referring to the exemplary method depicted in the flow chart of FIG. 3, the process starts with the generation of source code (step 302) and the insertion of metadata within that source code (step 304). Typically, these steps would be performed more or less contemporaneously by a programmer using an IDE or other code authoring software. In other embodiments, these steps may be automated via one or more code generation systems.

Next, the source code is compiled to an intermediate representation (step 306). In JAVA, for example, this intermediate representation will correspond to JAVA bytecode. In other languages, the term "bytecode" may not be used; however, embodiments of the present invention may be used in connection with any software development environment now known or later developed that compiles to an intermediate representation, including, without limitation, JAVA, Lua, .Net, C#, Visual Basic .NET, and Python.

Next, during load time of the intermediate code (which may occur, for example, when classes are needed during runtime), the metadata is read (step 308). In the illustrated embodiments, a custom class loader or agent understands this metadata and can act accordingly. In other embodiments, however, the virtual machine and its class loaders may not understand the particular metadata used. Even though a given class loader/agent might not understand the metadata, it would still be able to load the classes without any errors because the metadata annotations do not affect the classes syntactically. In general, it is the programmer's responsibility to ensure that, if a class loader ignores metadata, then the class still functions as expected.

As shown in step 310, then, if the metadata is understood ("Y" branch from 310), the classes and software components are loaded based on the metadata criteria (step 314). Generally, the code loaded during step 314 will be a subset of the intermediate code generated in step 306. If not ("N" branch from 310), default classes are loaded—i.e., all of the intermediate code generated in step 306 will be loaded without any modifications. This will also mean that the loaded classes/intermediate code could contain redundant code which will never be part of the program's control flow. The virtual machine will then execute the implemented class in the normal course.

Figure 5:
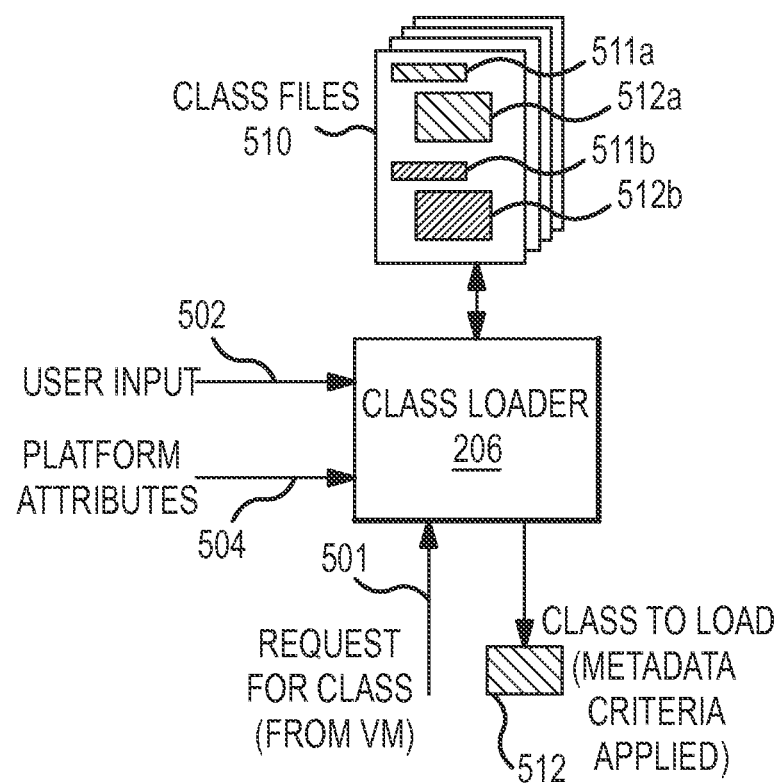
FIG. 5 is a conceptual block diagram of a class loading system and method in accordance with one embodiment of the present invention.

The process illustrated above is depicted in conceptual block diagram form in FIG. 5. As shown, class loader 206 receives a request 501 for a class at some point in the software execution process—generally, during load time. Class loader 206 then reads the appropriate class files 510, which include various software components 512 (classes, variables, methods, etc.) that have been annotated in some way by metadata

511. Conceptually, for example, metadata 511*a* annotates software component 512*a*, metadata 511*b* annotates software component 512*b*, and so on.

Class loader 206 evaluates any criteria defined by metadata 511, and decides whether to send the respective software component 512 back to the virtual machine for execution. The criteria may relate to user input 502 (e.g., a command line parameter input provided during execution), platform attributes 504 of the target hardware and/or software platform, and any other platform state information that might prove useful in determining which software components 512 should be loaded.

Platform attributes generally include characteristics of the target computing device itself—that is, the hardware upon which the software is ultimately implemented. Examples include memory capacity, processor type (single-core or dual-core), processor speed, user interface capabilities (e.g., touch-screen, multi-touch, etc.), display type, and security requirements.

Platform state criteria might relate to a geographical position of the computing device, the orientation of the device, the temperature (or other environmental condition) of the device, or the acceleration of the device.

Figure 6:
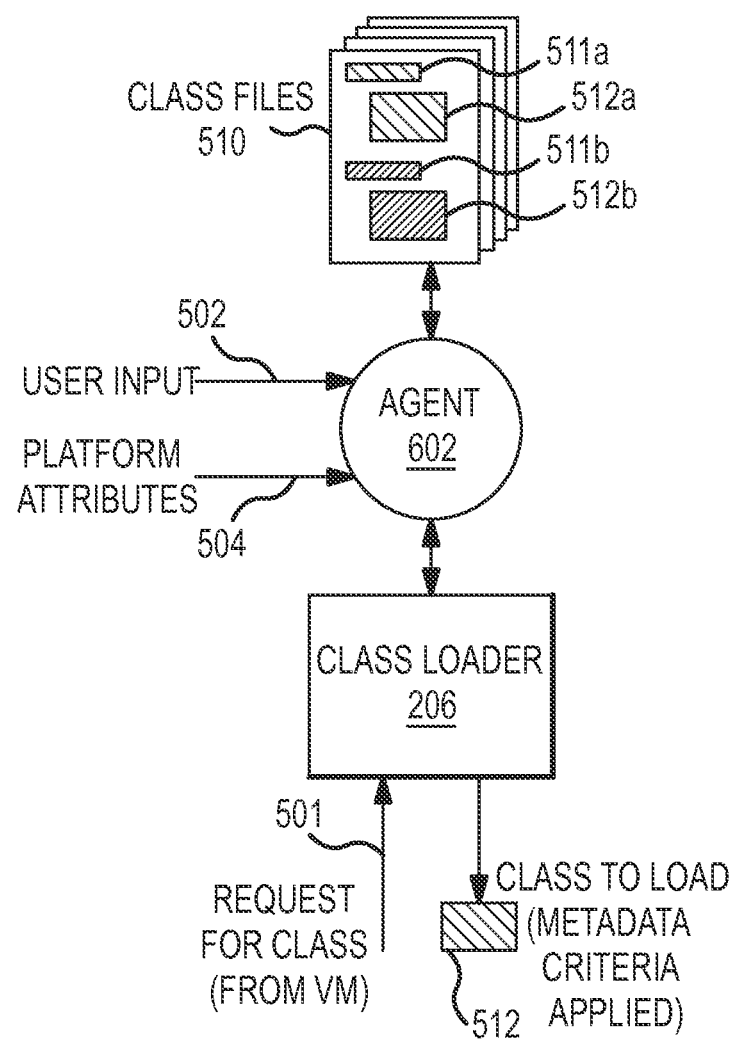
FIG. 6 is an alternate embodiment of the system and method depicted in FIG. 5.

After evaluating the received class files based on the criteria, the resulting implemented class 512 is then sent to the virtual machine. In an alternate embodiment, however, as shown in FIG. 6, an agent 602 communicates with class loader 206 and is employed to read class files 510, evaluate the criteria, and transmit them to class loader 206 before being sent to the virtual machine. Stated another way, agent 602 (e.g., a JAVA agent) effectively acts as a "middle man" to take care of reading and evaluating the metadata before class loader 206 even sees it.

The various software and hardware components that compose modern microprocessor-based computing devices, such as general purpose computers, smartphones, and PDAs, are generally well known in the art. However, it is illustrative to review these components in the context of various embodiments of the present invention.

Figure 4:
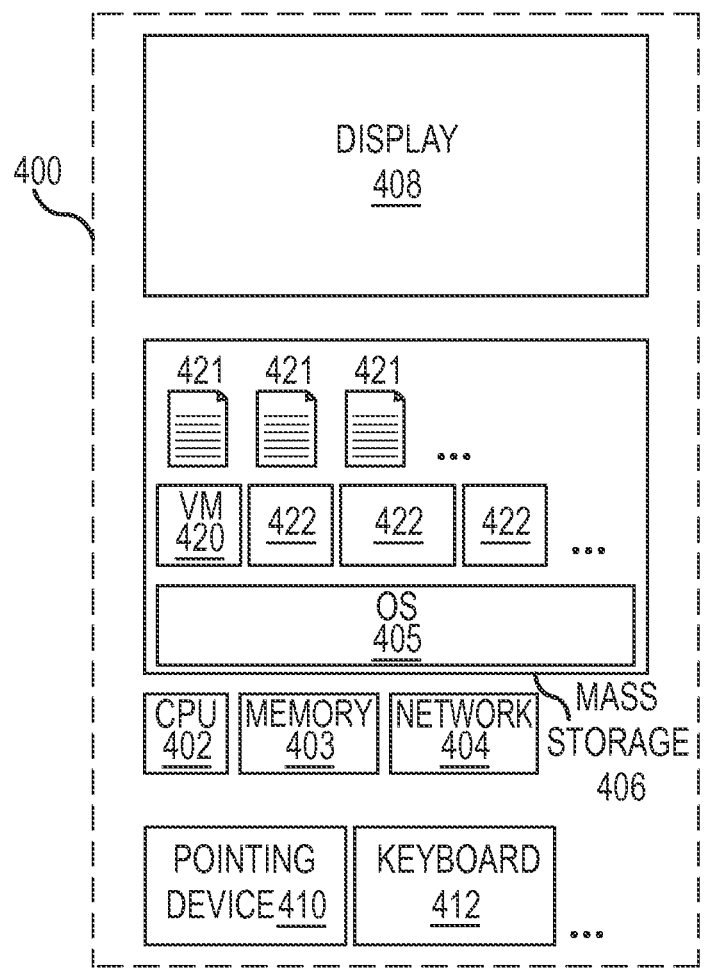
FIG. 4 is a conceptual block diagram of a typical hardware platform with which a user may design and/or run software code.

Referring to FIG. 4, a microprocessor-based device (or simply "device") 400 generally includes a display 408 (e.g., an LCD, "liquid-ink", or touch-screen display), one or more mass storage components 406 (e.g., solid state drives or disk drives), one or more CPUs 402 (e.g., microprocessors, cores, microcontrollers), one or more memory components (RAM, ROM, etc.) 403, one or more network interfaces 404 (e.g., wireless 802.11 or wired Ethernet), one or more pointing devices 410 (computer mice, trackballs, etc.), and any number of other input/output devices, such as a keyboard 412. Mass storage 406 will generally be used to store an operating system 405 (e.g., Windows, MacOS, Linux), one or more files 421, and one or more applications 422. Persons skilled in the art will recognize that device 400 will typically include a large number of additional electronic components, including buses, interconnects, printed circuit boards, etc., which for the purposes of clarity have not been included in FIG. 4.

In the event a device 400 is used for software development, that is, the creation of source code as depicted in FIG. 1, files 421 and applications 422 will generally include the suite of software components related to the SDK and IDE being used, as well as the source code files 112 being developed.

When device 400 is being used to execute the bytecode or other intermediate code 114, a VM and other components of the runtime environment will exist within mass storage 406. That is, CPU 402 is configured to execute the virtual machine 420 such that it generates a class request, and the class loader and/or agent, when executed by virtual machine 420, are configured to receive the class request, retrieve a class file associated with the class request, examine the class file for metadata defining criteria associated with one or more software components provided within the class file, evaluate the criteria, and load a selected set of the software components based on the criteria, thereby forming an implemented class.

In a particular embodiment, as mentioned briefly above, the metadata corresponds to JAVA annotations. Annotations, in the JAVA environment, are a general purpose type of metadata that permits a coder to define and use custom annotation types. It consists of syntax for declaring annotation types, a syntax for annotating declarations, APIs for reading annotations, a class file representation for annotations, and an annotation processing tool. As metadata, annotations do not directly affect program semantics (and are not themselves part of the implemented program), rather, they affect the way programs are treated by tools and libraries, which can in turn affect the semantics of the running program. Annotations can be read from source files, class files, or reflectively at run time. Note that while some software environments, such as Python, allow classes to be defined at runtime, the criteria for doing so is embodied in the actual program code itself (e.g., via "if . . . then," and "case" flow controls), rather than metadata. As a result, such schemes are undesirable in that they increase the size of the software while consuming extra processor cycles.

JAVA annotation types may be declared, and are similar to conventional interface declarations. That is, an at-sign (@) precedes an "interface" keyword. Each method declaration defines an element of the annotation type, and return types are restricted to primitives, String, Class, enums, annotations, and arrays of these types. Once an annotation type is defined, it can then be used to annotate software components.

A JAVA annotation is a special type of modifier, and can generally be used anywhere that other modifiers (such as "public," "static or "final") can be used. By convention, annotations precede other modifiers. Annotations consist of an at-sign (@) followed by an annotation type and a parenthesized list of element-value pairs, wherein the values are compile-time constants. For additional information regarding JAVA annotations, a number of standard references may be consulted, including, for example, Core JAVA, Vol. 2: Advanced Features, 8th Ed. (2008). Having thus given an overview of JAVA annotations in accordance with one embodiment, an example will now be described.

There are many cases where a tradeoff exists between memory footprint (the amount of memory used by the program) and application throughput (the speed at which the program is executed). For example, within JAVA's own library is a String class (java.lang.String), which includes a field called "hash" that is used to store the hash code of String objects. It was determined by the developers of JAVA that computing the hash code of a String object every time it is required could consume a significant number of processor cycles, and thus a field was created and the hash value calculated once and cached. An alternate implementation, however, might prefer to suffer this computing overhead rather than the cost of adding a 32-bit field to every String object being allocated.

Thus, to allow the JAVA runtime environment to choose between two implementations of this hash value calculation at load time, annotations may be employed as shown in the following pseudocode fragment:

```
@When("LARGEMEM")
private int hash;
@When("LARGEMEM")
public int hashcode( ){
    if (hash == 0){
        hash=computeHash( );
    }
    // compute and initialize hash code if it has not already been
      computed return hash;
}
@WhenNot("LARGEMEM")
public int hashcode_whenNot_LARGEMEM( ){
    int hash = computeHash( );
    // compute hash code every time;
    return hash;
}
```

In this example, the metadata "@when("LARGEMEM")" annotates the next line, i.e., the integer declaration "private int hash;". The same metadata is also used to annotate the public int hashcode( ) method. Similarly, the metadata "@When Not("LARGEMEM")" is used to annotate the hashcode_whenNot_LARGEMEM( ) method.

As will be apparent, the metadata allows the system to choose between implementing two methods, hashcode( ) and hashcode_whenNot_LARGEMEM( ), based on the @when annotation. The parameter "LARGEMEM" may be user generated (e.g., via a command line argument), or may be determined at load time based on the hardware platform's memory and/or processor capabilities.

In another example, annotations are used to annotate synchronized code. For example, if a user specifies that certain code is always called within a single thread, the annotations may be used to eliminate the synchronization cost associated with the code.

In yet another example, an alternate implementation of certain code can be used based on the hardware configuration of the platform being used to run the program. For example, a search on a large array can be split among multiple threads where there are multiple cores available for the VM, or traversed in one direction by a single thread if only one core is available to the VM.

In another example, the location (e.g., GPS coordinates) of a mobile device is used to determine which classes should be loaded. For example, if the system determines that it is located in Germany, it may load classes that are specific to operation within a cellular grid or WiFi network in that geopolitical area.

In another embodiment, alternate code is implemented based on whether the application is meant to run on a specific device, for example, an airport kiosk vs. an airline website. The look and feel and other aspects of the application may then be varied using a common code base.

In another embodiment, alternate implementations are provided based on whether the application is a trial version or a licensed version. In yet another embodiment, alternate implementations are provided based on the level of encryption required based on where the source and target of transferred data lie (internal systems as source/target—do not bother encrypting data, data crossing company intranet—encrypt the data).

A variety of class loaders and/or agents may be employed to evaluate the criteria and load the classes and software components accordingly. The following is an exemplary class loader (in pseudocode) for use with the example provided above.

```
public byte[ ] transform(String className, byte[ ] bytes) {
    if className is "java.lang.String" {
        Model model = create a model of the class based upon the
            current bytes
        if systemMemory < thresholdValue { //application suggests
            using smaller
    memory footprint
            for each field in the model {
                if field has annotation @when("LARGEMEM"){
                    strip field from model // remove this field if
                        memory is low
                }
            }
            for each method{
                if method has annotation @when("LARGEMEM"){
                    strip the method from the model // do not want
                        this method
                }
                if method has annotation @whennot("LARGEMEM")
                    and method
    name ends with "_whenNot_LARGEMEM" {
                    remove "_whenNot_LARGEMEM" from the
                        method name
                }
            }
        }else{ // memory >= thresholdValue
            for each method{
                if method has annotation @whennot("LARGEMEM")
                    and method
    name ends with "_whenNot_LARGEMEM" {
                    strip the method from the model // do not want
                        sthis method
                }
            }
        }
        byte[ ] newBytes = convert the mutated model back to bytes
        return newBytes // These bytes include our changes
    } else {
        return bytes // We made no changes
    }
}
```

In JAVA embodiments, because the metadata conforms to the existing JAVA annotation standards, it is not necessary to change the virtual machine to accommodate them. Any JAVA compiler will merely place the annotations in a class file. If the runtime does not have knowledge of the annotations, then a default state of the class will be taken. This allows the method to be backward-compatible with virtual machines that do not know how to conditionally replace code at runtime. The source code is therefore preferably written so that each class functions correctly even if no transformations take place While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for deferring software implementation, the method comprising:
    creating one or more source code files having a plurality of software components provided therein;

annotating a selected set of the software components with metadata defining one or more criteria, thereby creating one or more annotated source code files;

compiling, using a processor of a computing system, the annotated source code files to create one or more intermediate code files; and loading one or more of the selected set of software components from the intermediate code files based on the criteria defined by the metadata in the software components, wherein the criteria includes a condition that is expressed within the metadata itself and that is evaluated based on a hardware configuration of the computing system to determine whether each of the annotated software components is loaded during load time.

2. The method of claim 1, further including executing the loaded software components within a microprocessor-based device during a runtime.

3. The method of claim 2, further including loading the one or more selected set of software components in response to a class load request received during the runtime.

4. The method of claim 1, wherein the one or more criteria includes a criterion based on attributes of a target hardware platform.

5. The method of claim 1, wherein the one or more criteria includes a criterion based on user input.

6. The method of claim 1, wherein the one or more criteria includes a criterion based on a state of a targeted hardware platform.

7. The method of claim 1, wherein the step of annotating includes employing annotations within a computer language configured to be compiled to bytecode interpreted by a virtual machine.

8. The method of claim 1, wherein the software components are selected from the group consisting of classes, variables, methods, and parameters.

9. The method of claim 1, wherein, in the event the metadata is not understood, loading one or more default software components.

10. A computer program product, comprising a non-transitory computer-usable medium storing computer readable program code embodied therein, said computer readable program code adapted to be executed to implement a class loading method comprising:

retrieving a class file associated with a class request;

examining the class file for metadata defining criteria associated with one or more software components provided within the class file; and loading a selected set of the software components in a computing system based on the criteria defined by the metadata in the class file, wherein the criteria includes a condition that is expressed within the metadata itself and that is evaluated based on a hardware configuration of the computing system to determine whether each of the software components annotated by the metadata is loaded during load time.

11. The computer program product of claim 10, wherein the class metadata handler is a class loader.

12. The computer program product of claim 10, wherein the class metadata handler is an agent.

13. The computer program product of claim 10, wherein the class metadata handler comprises bytecode.

14. The computer program product of claim 10, wherein the criteria are selected from the group consisting of platform attribute criteria, user input criteria, and platform state criteria.

15. A computing device comprising:

a processor;

a mass storage component;

a virtual machine stored on the mass storage component; and intermediate code stored on the mass storage component;

wherein the processor is configured to execute the virtual machine such that it generates a class request;

wherein the computer instructions, when executed by the virtual machine, are configured to receive the class request, retrieve a class file from the intermediate code associated with the class request, examine the class file for metadata defining criteria associated with one or more software components that are annotated with the metadata and are provided within the class file, evaluate the criteria based on a hardware configuration of the computing device to determine whether each annotated software component is loaded during load time, and load a selected set of the software components based on the criteria defined by the metadata in the software components, thereby forming an implemented class, wherein the criteria includes a condition expressed within the metadata itself.

16. The computing device of claim 15, wherein the virtual machine is configured to run the implemented class.

17. The computing device of claim 15, wherein the criteria includes a criterion based on user input.

18. The computing device of claim 15, wherein the criteria includes a criterion based on an attribute of the computing device.

19. The computing device of claim 18, wherein the criterion is selected from the group consisting of memory capacity, processor type, user interface capabilities, display type, and security features.

20. The computing device of claim 15, wherein the criteria includes a criterion based on a state of the computing device.

21. The computing device of claim 20, wherein the criterion is selected from the group consisting of a geographical position of the computing device, an orientation of the computing device, a temperature of the computing device, and an acceleration of the computing device.

* * * * *